United States Patent [19]
Cassidy et al.

[11] Patent Number: 5,124,044
[45] Date of Patent: Jun. 23, 1992

[54] PHOSPHATE REMOVAL FROM AQUARIA USING IMMOBILIZED FERRIC HYDROXIDE

[75] Inventors: Edward J. Cassidy, Stuart; Ronald D. Jones, Sunrise, both of Fla.

[73] Assignee: Precision Aquarium Testing Inc., Stuart, Fla.

[21] Appl. No.: 639,048

[22] Filed: Jan. 9, 1991

[51] Int. Cl.$^5$ ................................................ C02F 1/58
[52] U.S. Cl. .................................... 210/683; 210/747; 210/169; 210/170; 210/504
[58] Field of Search ............... 210/169, 170, 747, 683, 210/500.29, 504, 503, 906, 504

[56] References Cited

U.S. PATENT DOCUMENTS

| | | | |
|---|---|---|---|
| 3,499,837 | 3/1970 | Jaunarajs | 210/906 |
| 3,723,306 | 3/1973 | Bridgeford | 210/500.29 |
| 3,984,313 | 10/1976 | Higgins | 210/903 |
| 5,019,311 | 5/1991 | Koslow | 210/502.1 |

Primary Examiner—Stanley S. Silverman
Assistant Examiner—Cynthia L. Nessler

[57] ABSTRACT

Immobilized ferric hydroxide selectively removes phosphate from aquarium water. The material provides a healthier environment and retards growth of undesirable algae and bacteria.

1 Claim, No Drawings

PHOSPHATE REMOVAL FROM AQUARIA USING IMMOBILIZED FERRIC HYDROXIDE

BACKGROUND

1. Field of Invention

This invention relates to aquarium water quality, specifically an improved method for phosphate removal.

2. Description of Prior Art

Phosphate accumulates in aquaria. High concentrations allow undesirable algae and bacteria to flourish and can kill desirable inhabitants.

Heretofore several procedures and products have been used for phosphate removal.

Frequent phosphate-free water replacement has been used, resulting in harmful water chemistry changes (e.g. pH, hardness). This procedure is always laborious and is expensive if bottled water or salts are required.

Frequent replacement of filtration gravel beds has been used. Heavy and large amounts of these substrates (e.g. calcium carbonate, aluminum silicate) are needed. This procedure is always laborious and expensive.

Ion exchange resins, reverse osmosis, hydrophilic acrylic polymers (i.e. the marine filter in U.S. Pat. Nos. 4,076,619 to Howery 1978, Feb. 2) and submicronic hydrophilic filters (i.e. the filter in U.S.. Pat. No. 4,620,932 to Howery 1986, Nov. 4) have been used. Not being phosphate specific, these products are slow, of limited capacity, laborious, expensive, and require sophisticated knowledge and apparatus for use.

OBJECTS AND ADVANTAGES

Accordingly, several objects and advantages of our invention are:

1. Immobilized ferric hydroxide is very specific for phosphate removal. Unlike other products it does not remove beneficial or innocuous water constituents.
1. This specificity results in very rapid phosphate removal. Immobilized ferric hydroxide lowers phosphate levels in just minutes. Other products require days, weeks, or months.
3. This specificity allows for the use of small quantities of material. Other products require the repeated use of much greater material to achieve results.
4. This specificity eliminates the effect of other water constituents on this material's efficiency. Repeated testing of phosphate levels to evaluate this material's performance is unnecessary. A calculation accurately predicting the amount of phosphate which will be removed can be made based on the amount of material used. The efficiency of other products is significantly influenced by the variability of non-phosphate related water constituents.
5. Because any absorbent substrate can be used and this specifty, this material can be made in an inexpensive from.
6. Because any absorbent substrate can be used, this material can be made in many forms (e.g. pads, beads, flakes, fibers) for convent and non-laborious use.

DESCRIPTION O INVENTION

The present invention involves the process of obtaining ferric hydroxide immobilized onto absorbent substrate for phosphate removal from aquaria. Many different absorbent substrates can be used. Several variations of the process are possible. The preferred embodiments of the process are described in the following six step procedure.

Step 1

Uncompressed cellulose sponge pads are soaked in a 25% aqueous solution of technical grade ferric chloride hexahydrate ($FeCl_3 \cdot 6H_2O$) at $25° \pm 5°$ C. temperature for two minutes.

Step 2

/The sponge pads are compressed to remove excess ferric chloride solution.

Step 3 the pads are then soaked in a 4% ammonium hydroxide (phosphate free-less than 0.01ppm) solution at $25° \pm 5°$ C. temperature for two hours.

Step 4

The pads are then compressed to remove excess ammonium hydroxide solution.

Step 5

The pads are then rinsed in phosphate free (less than 0.01 ppm) water until ammonia levels in rinse water are below 0.01 ppm.

Step 6

The pads are then compressed to remove excess water and package in an airtight moisture proof container.

Steps 1 & 2 of this process provide for the immobilization of ferric chloride onto the sponge pad. Steps 3 & 4 of this process results in the conversion of immobilized ferric chloride to immobilized ferric hydroxide. Step 5 of this process removes excess ammonia which is toxic to most aquaria inhabitants. Step 6 of this process serpents dehydration of the pad and subsequent conversion of ferric hydroxide to ferric oxide.

Almost any absorbent substrate can be substituted for the above mentioned cellulose sponge pad. Other substrates which may be used include but are not limited to; paper, natural sponge, acrylic fibers, zeolite, crushed coral, and charcoal. Variations in the ability of each material to accept immobilized ferric chloride and ferric hydroxide exist.

The above mentioned six step preferred process was selected because satisfactory immobilization rates (up to 15% of absorbing substrate's weight) can be achieved using; fewest manufacturing steps; fewest raw materials; and inexpensive, lightweight, and readily available absorbent substrate. In addition, the preferred process does not require special pH or temperature control.

OPERATION OF INVENTION

Phosphate is removed from the aquarium by placing the substrate with immobilized ferric hydroxide anywhere in the filtrations system. As water containing phosphate makes contact with the material phosphate is removed. Phosphate removal is accelerated if water is forced to pass through, rater than around, the material.

When the preferred process is used, a pad measuring 15 cm by 23 cm by 2 cm will remove more than 400 mg of phosphate.

We believe phosphate is removed according to the following reaction;

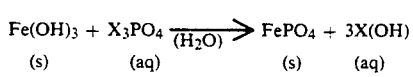

While we believe this reaction is responsible for phosphate removal, we do not wish to be bound by this.

Once phosphate levels fall to desirable levels or the absorbent substrate becomes saturate with phosphate, the material can e removed and discarded. New material can be added whenever phosphate levels again rise to undesirable levels. In addition the material can be left in the aquarium to prevent phosphate accumulation.

CONCLUSION, RAMIFICATIONS, AND SCOPE OF INVENTION

Thus the reader will see that the material so the invention provides a highly reliable, lightweight, efficient, easy to use, yet economical device which can be used by almost any person regardless of their knowledge of aquaria or water chemistry.

While our above description contains many specificities, these should not be construed as limitations on the scope of the invention, bu rather as an exemplification of one preferred embodiment thereof. Many other variations are possible. For example. the material can also be used to prefilter water to remove phosphate before adding of the aquarium. Accordingly, the scope of the invention should be determined not by the embodiments described, but by the appended claims and their legal equivalents.

We claim:

1. The process for improving fish and invertebrate life sustaining low phosphate levels within a body of water constituting the habitate of fish and invertebrates, said process comprising the step of contacting said water with a material consisting of a sponge pad and ferric hydroxide with said ferric hydroxide immobilized within said sponge pad by soaking said sponge pad in a solution of ferric chloride and then soaking said sponge pad in a solution of ammonium hydroxide, wherein said material selectively absorbs phosphate from said body of water.

* * * * *